(12) United States Patent
Scottie

(10) Patent No.: US 6,305,529 B1
(45) Date of Patent: Oct. 23, 2001

(54) REFURBISHABLE CONVEYOR SYSTEM ROLLERS

(76) Inventor: David D. Scottie, 117 NW. 80th Ter., Margate, FL (US) 33063

( * ) Notice: Subject to any disclaimer, the term of this patent is extended or adjusted under 35 U.S.C. 154(b) by 0 days.

(21) Appl. No.: 09/127,434

(22) Filed: Jul. 31, 1998

(51) Int. Cl.[7] ................................................. B65G 39/10
(52) U.S. Cl. ................................................ 198/842; 193/37
(58) Field of Search ............................. 193/37; 198/842

(56) References Cited

U.S. PATENT DOCUMENTS

| | | | |
|---|---|---|---|
| 2,169,624 | * | 8/1939 | Weiss et al. ............................ 193/37 |
| 2,607,459 | * | 8/1952 | Ludwig et al. ......................... 193/37 |
| 2,825,439 | * | 3/1958 | Collis ...................................... 193/37 |
| 3,713,521 | * | 1/1973 | Moritake ................................. 193/37 |
| 3,841,721 | * | 10/1974 | Coutant et al. ......................... 193/37 |
| 4,203,509 | * | 5/1980 | Thompson et al. ..................... 193/37 |
| 5,433,308 | * | 7/1995 | Gagnon ................................... 193/37 |
| 5,642,800 | * | 7/1997 | East ........................................ 193/37 |
| 5,865,290 | * | 2/1999 | Scott ....................................... 193/37 |

* cited by examiner

Primary Examiner—Robert P. Olszewski
Assistant Examiner—Steven B. McAllister
(74) Attorney, Agent, or Firm—Malin, Haley & DiMaggio, P.A.

(57) ABSTRACT

A refurbishable conveyor system roller having an inner cylinder, an outer cylinder concentrically mounted over said inner cylinder, couplings at each end of said inner cylinder, an end cap at each end joined to said inner cylinder by the couplings, a bearing assembly removably mounted between said end caps and said inner cylinder and a steel rod passing through said roller for mounting or engaging said roller to a corresponding conveyor system.

13 Claims, 5 Drawing Sheets

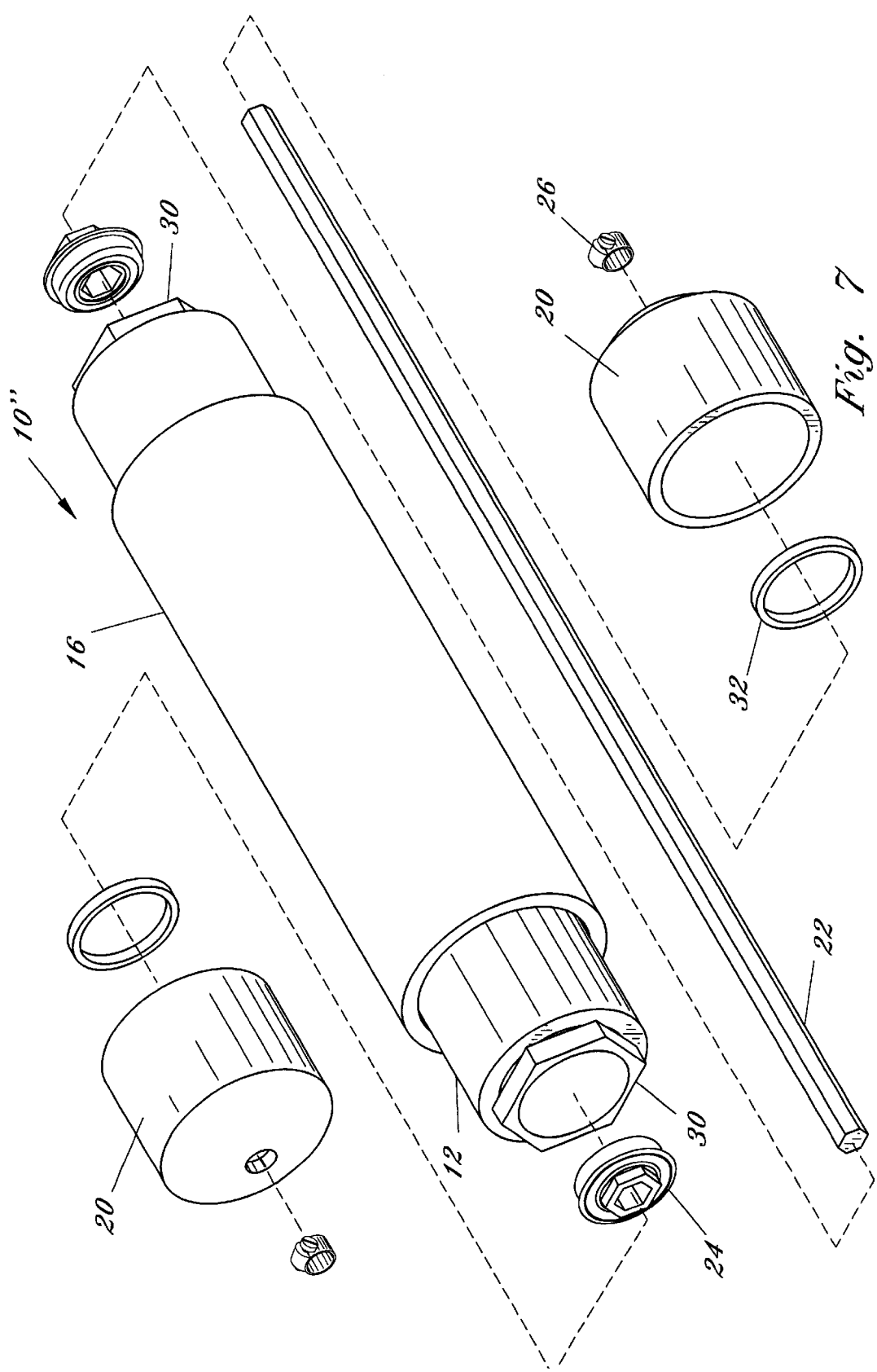

REFURBISHABLE CONVEYOR SYSTEM ROLLERS

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

This invention relates generally to rollers used in conveyor systems, and more particularly, to conveyor system rollers having modular and removable components that facilitate periodic maintenance of the rollers to replace worn parts, such as bearings, so that the rollers may be reused. The instant invention provides conveyor rollers that can be refurbished instead of completely replaced.

2. Description of Related Art

Conveyor systems are commonly employed in sanitary waste utilities. These conveyor systems use rollers to guide and support the conveyor belt. The rollers known have internally mounted bearings that allow the rollers to easily rotate. Over a period of time, usually 6 to 8 months, the bearings begin to crack and/or wear. This is caused by continuous long term exposure to load and shaft deflection. Under loaded conditions, the bearings are subject to misalignment, loss of bearing surface and pinching between the inter and outer races. This produces additional loading on the bearings which causes increased friction and temperature. The rollers are eventually rendered useless and must be replaced since conventional conveyor system rollers known cannot be easily refurbished with new bearing assemblies, especially in those systems employed by sanitary waste facilities.

A common problem with conventional rollers as used in conveyor systems in the sanitation industry is that the bearings are exposed at the ends of the rollers. As the bearings are not covered they are exposed to the elements such as gases, chemicals and moisture which cause a deterioration and complete breakdown well within a year's time. Consequently, there exists a need for a conveyor system roller that conceals bearings to extend their useful life while providing a way for conveniently replacing the bearings without having to replace the entire roller.

Several rollers for conveyor systems are known in the art. However, none of these provide a conveyor roller for use in sanitation conveyor systems that can be easily refurbished. Some of the rollers known have end caps which are not removable and/or are secured by complicated connectors and hardware which make removal of the end caps time consuming and complicated. For instance, U.S. Pat. No. 4,664,243, issued to Martin, discloses a conveyor or a bearing assembly. The bearing assembly disclosed by Martin has an outer race which is comprised of at least two adjoining and symmetrically mating sections which are held in position by molded projections located on the interior base of these two stabilizing lugs. The interior of the outer race of the spherical bearing is constructed to snugly encompass and rotatably engage the inner race, which comprises a spherical portion having a keyed axial bore and a pair of lateral keyed tubular hubs adjoining said bore on either side of said spherical portion. The bearing assembly disclosed by Martin comprises a single spherical bearing and design which is non-analogous to the problems and structure addressed by the instant invention. U.S. Pat. No. 4,577,747, issued to Martin, comprises a conveyor roller and bearing assembly comprising a tubular modular bearing system. The bearing system is complicated in design and must be completely replaced once it has extended its useful life. The '747 patent issued to Martin is non-analogous to the instant invention inasmuch as it fails to address the same pertinent problems and does not comprise structure for internally mounted bearings. U.S. Pat. No. 4,681,215, also issued to Martin, comprises a conveyor roller and bearing assembly with external support. The conveyor roller and bearing arrangement is rotatable by a pair of fixed stub axles lined between spaced side frame members, including a pair of self-aligning bearing assemblies in each end of the roller. Each bearing assembly in the '215 patent includes an inner bearing race mounted on one stub axle, an outer bearing race rotatably mounted on the inner bearing race and an outer cushioning sleeve secured to the roller and outer bearing race for maintaining axial alignment between the inner and outer bearing races. The '215 patent also represents non-analogous art, fails to disclose the structure contemplated by the present invention. U.S. Pat. No. 1,742,453, issued to Derhoef, discloses roller bearings mounted in bearing recesses wherein the bearings comprise a cup having a tapered surface which is forced into the recess by a pressed fit. The '453 patent is non-analogous to the teachings to the present invention and fails to contemplate the structure of the instant invention.

The foregoing art fails to teach or contemplate bear system rollers having modular and removable components that facilitate periodic maintenance other rollers to replace worn components, such as bearings, so that the rollers may be reused instead of replaced. As such device would provide great cost savings to utilities and other companies employing rollers with internally mounted bearings, the instant invention fills a need in the art.

BRIEF SUMMARY OF THE INVENTION

It is an object of the instant invention to provide a conveyor system roller that has a longer useful life.

It is another object of the instant invention to provide a conveyor system roller that prevents premature rusting of the bearings.

It is an additional object of the instant invention to provide a conveyor system roller that facilitates the convenient replacement of bearings so as to avoid the necessity of replacing the entire roller when the bearings deteriorate.

It is a further object of the instant invention to provide a conveyor system roller having an inner shaft and outer shaft.

It is still another object of the instant invention to provide a conveyor system roller having removable end caps that facilitate the replacement and/or maintenance of the bearings and which conceal the bearings from ambient elements.

It is still an additional object of the instant invention to provide a conveyor system roller that is designed in accordance with current industry standards for corresponding conveyor systems.

It is still another object of the instant invention to provide a conveyor system roller that is cost effective.

In light of these and other objects, the instant invention teaches a conveyor system roller generally comprising an inner cylinder, outer cylinder, octagonal steel rod, interior mountable bearing assembly, and an end cap assembly. The outer roller concentrically mounts over the inner cylinder to satisfy the requisite diametric requirements of the overall conveyor system roller and corresponding conveyor system and to provide additional structural strength for reducing the load on the bearing assemblies. The inner cylinder tightly mates with the inner wall of the outer cylinder and is dimensioned for receiving the end cap assembly.

Unlike the prior art, the instant invention provides a removable end cap assembly. The removable end cap assembly insulates the bearings from dust, moisture, chemicals, gases and other detritive elements. In addition, the end caps are removable to allow for the convenient maintenance and/or replacement of the bearing assembly. The end cap assembly includes a bearing holder, which holds and secures the bearing assembly. The bearing holder in the preferred embodiment is contiguously joined to the inner cylinder by an outer cylinder coupling. Alternatively, the bearing holder may comprise a retaining ring for holding the bearing assembly and an inner diameter which snugly mates over the inner cylinder. In another alternative embodiment, the outer cylinder may extend beyond the inner cylinder for snugly receiving and securing the bearing holder. Obviously modifications can be made to the end cap assembly for retaining the bearing assembly and mounting to the outer and inner cylinder assembly without departing from the scope and spirit of the instant invention.

In accordance with these and other objects which will become apparent hereinafter, the instant invention will now be described with particular reference to the accompanying drawings.

BRIEF DESCRIPTION OF THE SEVERAL VIEWS OF THE DRAWINGS

FIG. 5 is a partial exploded view of an alternative embodiment of the conveyor system roller of the instant invention.

FIG. 7 is an exploded view of an alternative embodiment of the conveyor system roller of the instant invention.

DETAILED DESCRIPTION OF THE INVENTION

Figure 1:
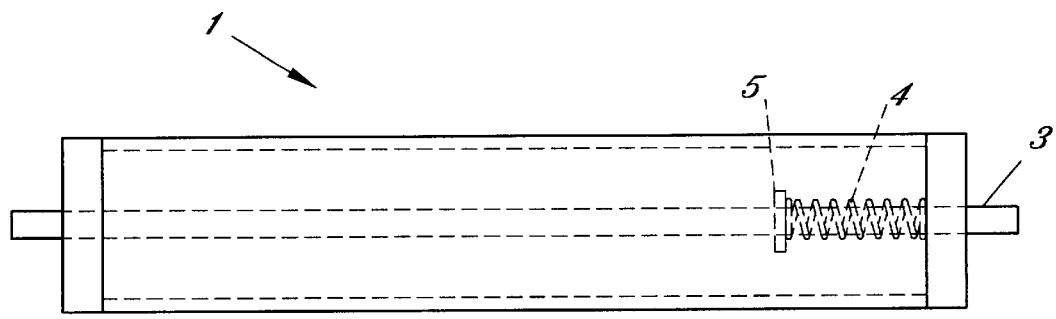
FIG. 1 is a partial cut away view of a prior art conveyor system roller.

With reference to the drawings, FIGS. 1–8 depict the preferred embodiments of the instant invention. The best mode of the invention is shown in FIGS. 1–4 and is generally characterized by the reference numeral 10. The alternative embodiments shown in the other figures are generally referenced by 10'. The instant invention provides a refurbishable conveyor system roller 10 comprising an inner cylinder 12, an outer cylinder 16, an outer cylinder 14, an end cap assembly 18, 20, and an internally mounted bearing assembly 24, a steel rod 22 and a clamp 26.

Figure 2:
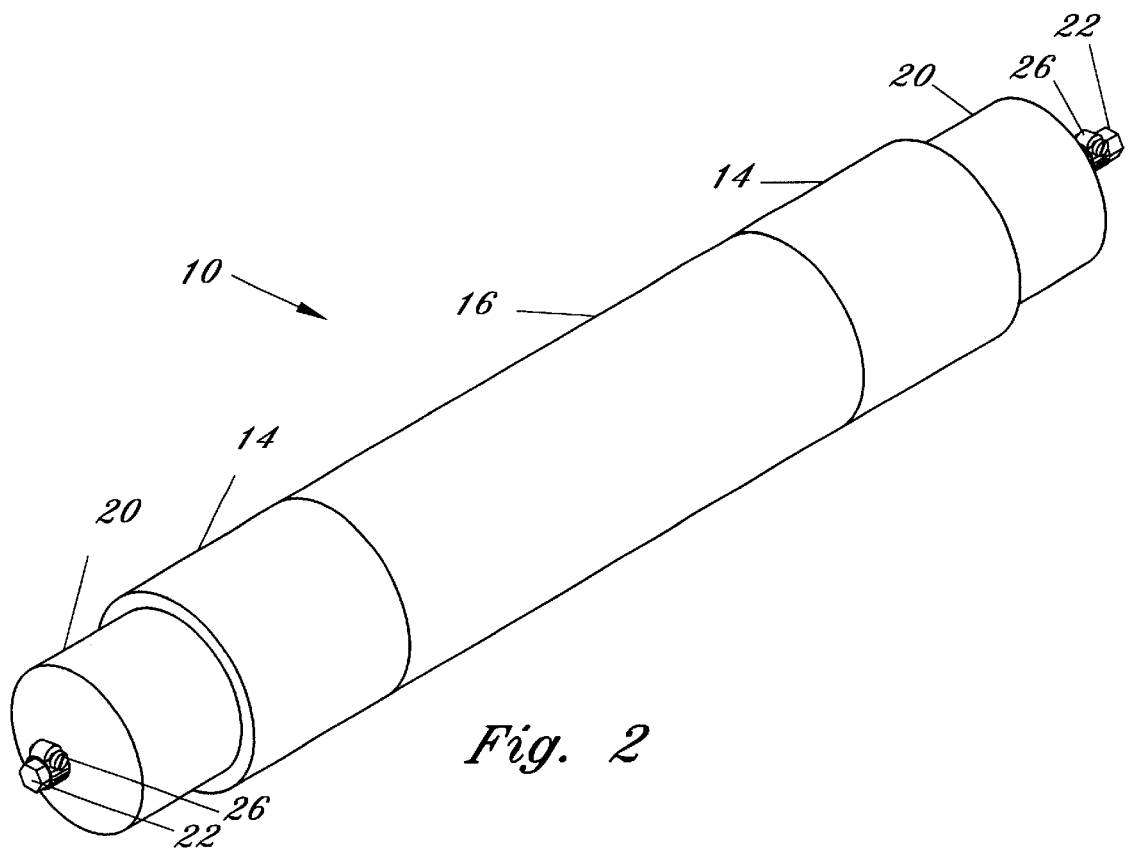
FIG. 2 is a perspective view of the preferred embodiment of the conveyor system roller of the instant invention.
Figure 3:
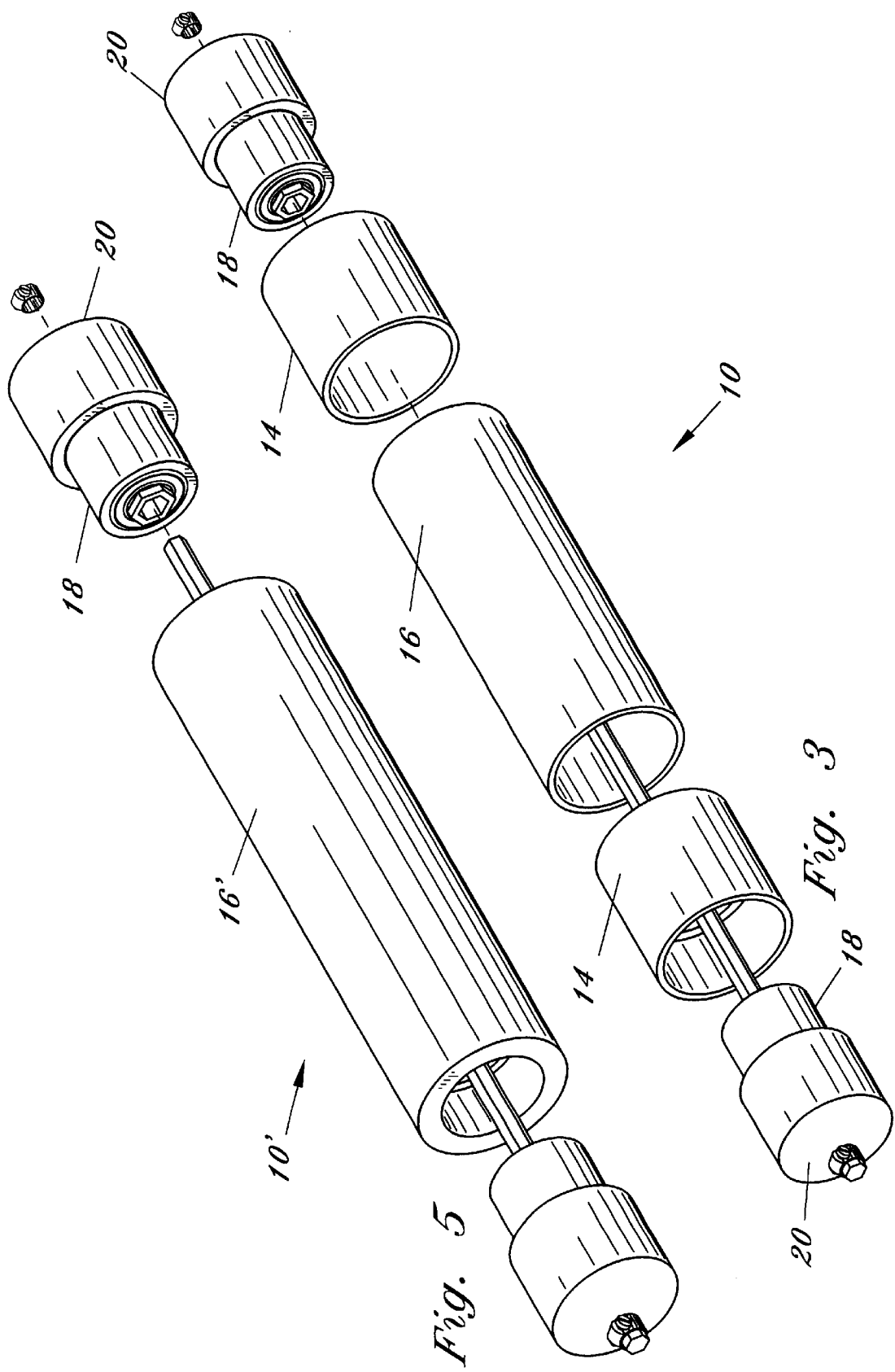
FIG. 3 is a partial exploded view of the preferred embodiment of the conveyor system roller of the instant invention.
Figure 4:
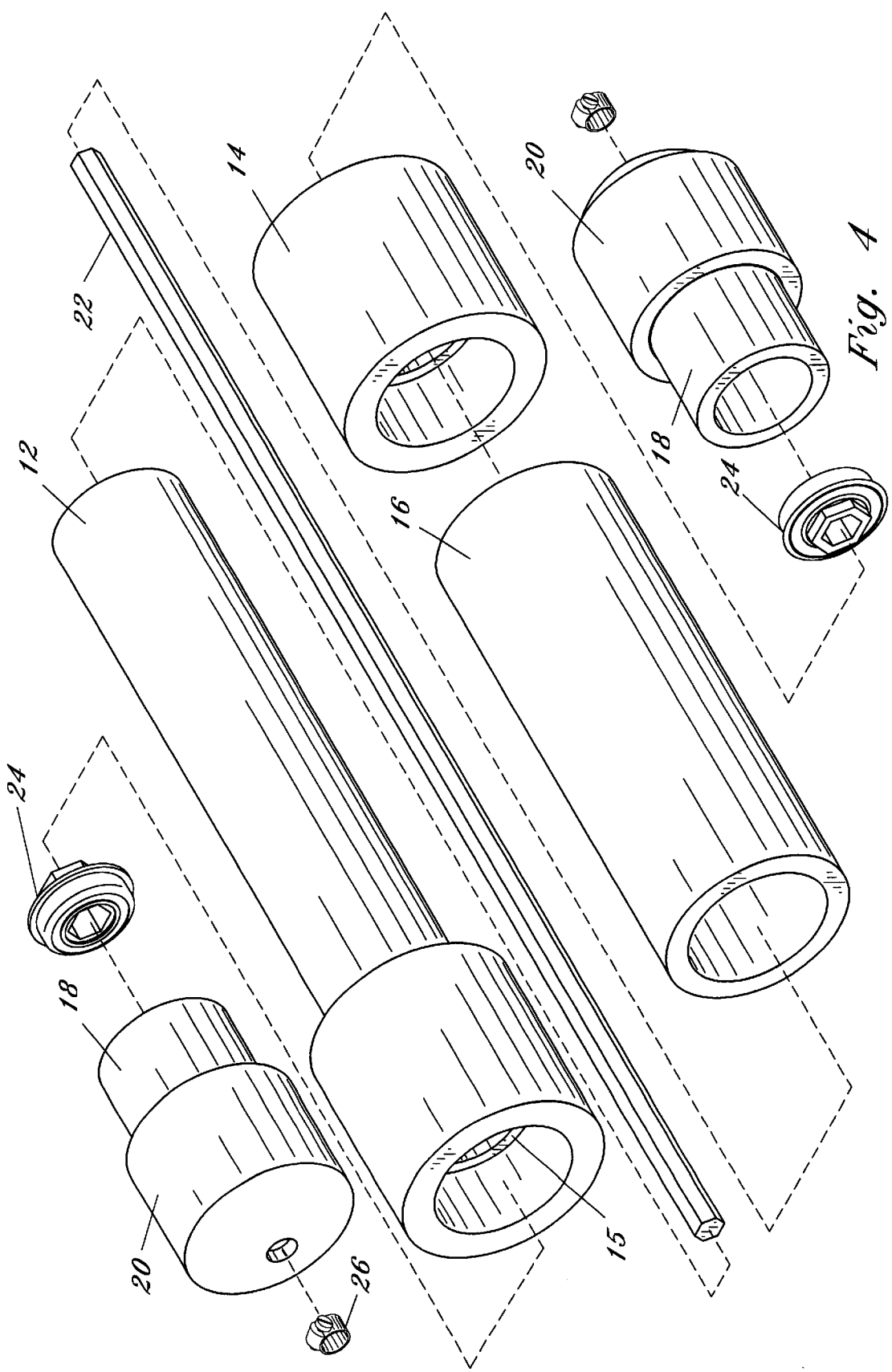
FIG. 4 is an exploded view of the preferred embodiment of the conveyor system roller of the instant invention.

With reference to FIGS. 1–4, 2–4, the inner cylinder 12 has an outer diameter which snugly and/or tightly mates concentrically with the inner diameter of the outer cylinder 16. The outer cylinder couplings 14 mount over the inner cylinder 12 at each end as shown in FIGS. 2, 3 and 4. The outer cylinder couplings 14 have an inner flange 15 which engages the end of the inner cylinder 12 when the coupling 14 is fully installed. The flange 15 limits the mounting depth of the coupling 14 over the inner cylinder 12. The end cap assembly 18, 20 mates with the outer cylinder coupling .14 at each end of the roller 10. The flange 15 and the coupling 14 controls the depth of engagement of the end cap assembly 18, 20. In addition, the flange 15 helps secure the bearing assembly 24 and the end cap assembly 18, 20. The steel rod 22 is preferably stainless and extends through a central axis defined by the cylinders of the roller 10 and extend beyond the rollers' ends. The steel rod 22 facilitates attachment of the roller to the requisite machinery. The clamps 26 secure the rod 22 within the roller 10 so as to prevent lateral movement of the steel rod 22 once installed.

The end cap assembly 18, 20 comprises a two tiered cylindrical piece. The end cap assembly comprises a cylinder end cap and bearing holder 18 and a bearing and end cap holder 20. The cylinder end cap and bearing holder 18 has an outer diameter corresponding to the outer diameter of the inner roller 12 and the inner diameter of the coupling 14. The outer diameter of the cylinder end cap and bearing holder 18 is sized to provide a tight, snug and secure mating connection with the coupling 14. The inner diameter of the cylinder end cap and bearing holder 18 is sized for receiving the bearing assembly 24 without allowing it to pass completely through. The bearing and end cap holder 20 has an outer diameter corresponding to the outer diameter of the outer cylinder 16. The bearing and end cap holder 20 is preferably permanently mounted on the cylinder end cap and bearing holder 18 but may be removably mounted so long as a firm, secure connection is made between the cylinder end cap and bearing holder 18 and the bearing and end cap holder 20. The bearing and end cap holder 20 defines the outer ends of the roller 10. The outer diameter of the end cap holder 20 and outer cylinder 16 are preferably uniform for evenly accommodating the conveyor system. However, the outer diameters of the end cap holder 20 and the outer cylinder 16 may vary without departing from the scope and spirit of the instant invention. The couplings 14 also receive and retain grease or other lubricants for keeping the bearing assembly 24 well lubricated.

The steel rod 22 preferably has a hexagonal cross section. The rod 22 is held in position by clamps 26 to prevent lateral movement. The rod 22 mechanically communicates the roller with the conveyor system.

Preferably, grease (not shown) or other conventional lubricants should be provided at each of the ends of couplings 14, and should also be disposed within the area defined within coupling 14. Grease or other conventional lubricants may also be similarly provided with respect to one or more couplings, rollers and/or cylinders of the various embodiments of the present invention.

Referring to FIG. 5, an alternative embodiment of the conveyor system roller 10 is shown and is referenced by the numeric character 10'. In this alternative embodiment, the roller 10' may comprise just an outer cylinder 16, thus eliminating the inner cylinder 12. In addition, the alternative embodiment 10' eliminates the outer coupling 14. Consequently, the cylinder end cap and bearing holder 18 tightly and/or snugly mates directly with the cylinder 16'. The engagement depth of the cylinder end cap 18 is dictated by the end cap holder 20. Preferably, the end cap holder 20 has an outer diameter substantially equal to the outer diameter of the cylinder 16'. As in the preferred embodiment, the inner diameter of the cylinder end cap and bearing holder 18 receives and secures the bearing assembly 24. Still referring to FIG. 5, the alternative embodiment 10' may alternatively include an inner roller 12. In this embodiment, the outer roller cylinder 16' has a length which exceeds the length of the inner cylinder 12. The inner cylinder 12 in this embodiment provides additional structural integrity. The length of the overlap of the outer cylinder 16' is substantially equal to the length of the cylinder end cap and bearing holder 18.

Figure 6A:
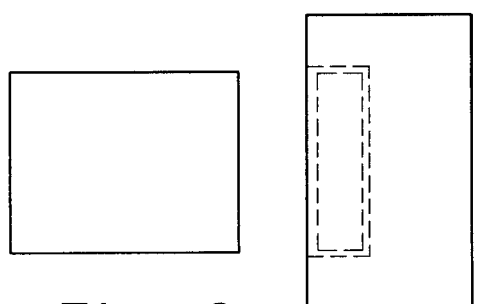
FIG. 6a is a partial exploded view of an embodiment of the end cap assembly of the instant invention.
Figure 6B:
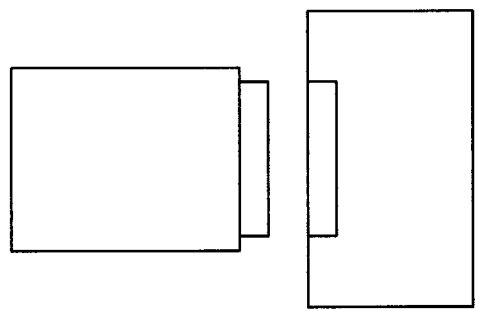
FIG. 6b is a partial exploded view of another embodiment of the end cap assembly of the instant invention.

With reference to FIGS. 6a and 6b, alternative embodiments for securing the bearing assembly are shown. Referring to FIG. 6a, the bearing assembly may be secured within the bearing and end cap holder 20. It may be secured by a retention ring, hardware adhesives, or any other means known in the art. With reference to FIG. 6b, the bearing assembly 24 may be movably mounted in the inner cylinder 12 and secured by the end cap holder 20 as shown. In this version, the end cap holder would have a recession adapted for snugly receiving the bearing assembly 24. In this embodiment, the cylinder end cap and bearing holder 18 is eliminated.

Figure 8:
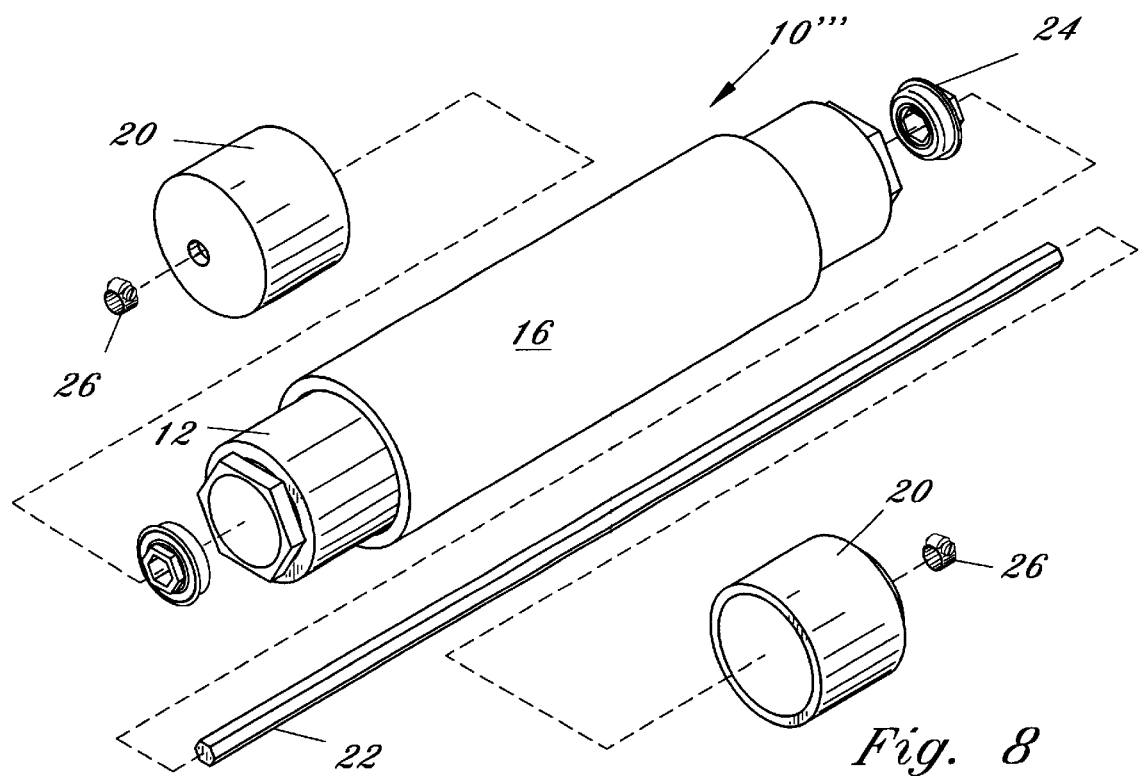
FIG. 8 is an exploded view of another embodiment of the conveyor system roller of the instant invention.

Referring to FIG. 7, another alternative embodiment of the instant invention is shown in reference by numeric character 10". In this embodiment, the cylinder end cap and bearing holders 18 are eliminated. Referring to FIG. 7, this embodiment comprises an inner cylinder 12 and an outer cylinder 16. The outer cylinder has a length which is less than the length of the inner cylinder 12. The end caps 20 have a length which is substantially equal to or slightly larger than the extended portions of the inner cylinder 12, as shown. In this embodiment, the bearing assembly 24 is mounted in the ends of the inner cylinder 12. The inner cylinder 12 includes a retaining nut at each end. The retaining nut mates with the inner diametric opening of the inner cylinder 12. The retaining nut 30 snugly receives the bearing assembly 24 and secures it therein. The end caps 20 mount over the bearing assembly, retaining nut 30 and extended portions of the inner cylinder 12. The end cap 20 secures the bearing assembly 24 against the retaining nut 30. An additional retaining ring 32 may be employed in the end cap 20 for engaging and securing the outer surface of the bearing assembly 24. A steel rod passes through the central axial passage of the roller 10" and extends beyond each end of the roller 10" for engaging the corresponding machinery. Once again, clamps 26 are used to laterally secure the rod 22. With reference to FIG. 8, another alternative embodiment of the instant invention is shown and referenced by numeric character 10'". In this embodiment the retaining ring 32 is eliminated. All other aspects of the roller 10'" are the same or substantially similar to alternative embodiment 10".

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A refurbishable conveyor system roller, said roller comprising:

an inner cylinder having a first end and a second end and an outer cylinder having a first end and a second end, said outer cylinder being concentrically mounted snugly over said inner cylinder, said inner cylinder having a uniform outer diameter and said outer cylinder having a uniform outer diameter;

a first end cap assembly and a second end cap assembly;

first mounting means for removably mounting said first end cap assembly at the first end of said inner cylinder, said first mounting means facilitating the mating of said first end cap assembly to said inner cylinder;

second mounting means for removably mounting said second end cap assembly at the second end of said inner cylinder, said second mounting means facilitating the mating of said second end cap assembly to said inner cylinder;

a first bearing assembly removably mounted between said first end cap assembly and said first end of said inner cylinder;

a second bearing assembly removably mounted between said second end cap assembly and said second end of said inner cylinder; and means for engaging said roller to a corresponding conveyor system;

wherein said first end cap assembly comprises a first cylindrical section joined integrally with a larger second cylindrical section, said first cylindrical section having an outer diameter adapted for mating with said first mounting means and corresponding to the outer diameter of said inner cylinder;

wherein said second end cap assembly comprises a third cylindrical section joined integrally with a larger fourth cylindrical section, said third cylindrical section having an outer diameter adapted for mating with said second mounting means and corresponding to the outer diameter of said inner cylinder.

2. A roller as recited in claim 1, wherein said first mounting means comprises a first coupling mounted to said inner cylinder first end and said second mounting means comprises a second coupling mounted to said inner cylinder second end, said first coupling joining said first end cap assembly to said inner cylinder first end contiguous to a first end of a passage defined by said inner cylinder, said second coupling joining said second end cap assembly to said inner cylinder second end contiguous to a second end of the passage.

3. A roller as recited in claim 1, wherein an outer diameter of said second cylindrical section corresponds to the outer diameter of said outer cylinder and an outer diameter of said fourth cylindrical section corresponds to the outer diameter of said outer cylinder; wherein said second cylindrical section, said first mounting means, said outer cylinder, said second mounting means and said fourth cylindrical section define an outer surface area of the roller.

4. A roller as recited in claim 1, wherein outer diameters of said second cylindrical section, said first mounting means, said outer cylinder, said second mounting means and said fourth cylindrical section are substantially the same.

5. A roller as recited in claim 1 wherein said inner cylinder and said outer cylinder are constructed f rom the same material.

6. A roller as recited in claim 1, wherein said inner cylinder, said outer cylinder, said first coupling, said second coupling, said first end cap assembly and said second end cap assembly are constructed from the same material.

7. A roller as recited in claim 6 wherein said same material is PVC.

8. A roller as recited in claim 1 wherein said first coupling having a first inner flange and said coupling having a second inner flange.

9. A refurbishable conveyor system roller, said roller comprising:

an inner cylinder having a first end and a second end and an outer cylinder having a first end and a second end, said outer cylinder being concentrically mounted snugly over said inner cylinder, said inner cylinder having a uniform outer diameter and said outer cylinder having a uniform outer diameter;

a first end cap assembly and a second end cap assembly;

a first coupling mounted at one end to the first end of said inner cylinder and at its second end to said first end cap assembly, said first coupling facilitating mating of said first end cap assembly at the first end of said inner cylinder, said first coupling having a first inner flange, said first end cap assembly slip fitted within said first coupling;

a second coupling mounted at one end to the second end of said inner cylinder and at its second end to said second end cap assembly, said second coupling facilitating mating of said second end cap assembly at the second end of said inner cylinder, said second coupling having a second inner flange, said second end cap assembly slip fitted within said second coupling;

a first bearing assembly removably mounted between said first end cap assembly and said first end of said inner cylinder;

a second bearing assembly removably mounted between said second end cap assembly and said second end of said inner cylinder; and means for engaging said roller to a corresponding conveyor system;

wherein said first coupling joining said first end cap assembly to said inner cylinder first end contiguous to a first end of a passage defined by said inner cylinder, said second coupling joining said second end cap assembly to said inner cylinder second end contiguous to a second end of the passage;

wherein said first end cap assembly comprises a first cylindrical section joined integrally with a larger second cylindrical section, said first cylindrical section having an outer diameter adapted for mating with said first coupling and corresponding to the outer diameter of said inner cylinder;

wherein said second end cap assembly comprises a third cylindrical section joined integrally with a larger fourth cylindrical section, said third cylindrical section having an outer diameter adapted for mating with said second coupling and corresponding to the outer diameter of said inner cylinder;

wherein an outer diameter of said second cylindrical section corresponds to the outer diameter of said outer cylinder and an outer diameter of said fourth cylindrical section corresponds to the outer diameter of said outer cylinder; wherein said second cylindrical section, said first mounting means, said outer cylinder, said second mounting means and said fourth cylindrical section define an outer surface area of the roller.

10. A roller as recited in claim 9, wherein outer diameters of said second cylindrical section, said first mounting means, said outer cylinder, said second mounting means and said fourth cylindrical section are substantially the same.

11. A roller as recited in claim 10 wherein said inner cylinder, said outer cylinder, said first coupling, said second coupling, said first end cap assembly and said second end cap assembly are constructed from the same material.

12. A roller as recited in claim 11 wherein said same material is PVC.

13. A roller as recited in claim 11 further comprising a lubricant disposed at least within said first coupling and said second coupling.

* * * * *